(12) United States Patent
Karnawat et al.

(10) Patent No.: US 7,526,470 B1
(45) Date of Patent: Apr. 28, 2009

(54) SYSTEM AND METHOD FOR MEASURING AND IMPROVING SEARCH RESULT RELEVANCE BASED ON USER SATISFACTION

(75) Inventors: Kuldeep Karnawat, Bellevue, WA (US); Thomas D. White, Carnation, WA (US); Mark B. Mydland, Bothell, WA (US); Steven C. Fox, Bothell, WA (US); Thomas A. Taylor, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 621 days.

(21) Appl. No.: 10/446,537

(22) Filed: May 28, 2003

(51) Int. Cl.
*G06F 17/30* (2006.01)
(52) U.S. Cl. .............. 707/3; 707/2; 707/4; 707/5; 707/6
(58) Field of Classification Search .............. 707/3, 707/5, 10, 2; 706/45
See application file for complete search history.

(56) References Cited

U.S. PATENT DOCUMENTS

| | | | | |
|---|---|---|---|---|
| 6,311,178 | B1 * | 10/2001 | Bi et al. ..................... | 707/3 |
| 6,421,675 | B1 * | 7/2002 | Ryan et al. ................ | 707/100 |
| 6,490,577 | B1 * | 12/2002 | Anwar ....................... | 707/3 |
| 6,701,311 | B2 * | 3/2004 | Biebesheimer et al. ..... | 707/5 |
| 2003/0033292 | A1 * | 2/2003 | Meisel et al. ............... | 707/3 |
| 2004/0249801 | A1 * | 12/2004 | Kapur ......................... | 707/3 |

OTHER PUBLICATIONS

Chen, J.R. et al., "Learning Subjective Relevance to Facilitate Information Access", *CIKM*, 1995, 218-225.

Dziadosz, S. et al., "Do Thumbnail Previews Help Users Make Better Relevance Decisions about Web Search Results?", *SIGIR*, 2002, 365-366.

Harper, D.J. et al., "A Language Modelling Approach to Relevance Profiling for Document Browsing", *JCDL*, 2002, 76-83.

Montague, M. et al., "Relevance Score Normalization for Metasearch", *CIKM*, 2001, 427-433.

Wu, P. et al., "Adaptive Nearest Neighbor Search for Relevance Feedback in Large Image Databases", *MM*, 2001, 89-97.

\* cited by examiner

*Primary Examiner*—Apu M Mofiz
*Assistant Examiner*—Monica M Pyo
(74) *Attorney, Agent, or Firm*—Woodcock Washburn LLP

(57) ABSTRACT

Systems and methods for measuring and improving search result relevance based on user satisfaction are disclosed. An event log is preferably scanned to determine the start and the end of a session. User behaviors within the session are preferably identified. User satisfaction is preferably estimated based on the user behaviors. User satisfaction is preferably a measure of the user's perception of the extent to which a result correlates to his intent based on his behaviors. User satisfaction is preferably estimated to be one of three satisfaction levels: satisfied, partially-satisfied, and dissatisfied. Symptoms, which are indications of a need for improvement within a search system, are preferably observed based on the user behaviors and the user satisfaction. Diagnostics, which are conditions that prevent a search system from performing optimally, are preferably derived based on the symptoms. A performance report for the search system based, at least in part, on the user satisfaction and the diagnostics may be generated. Such a report may be analyzed to determine methods for improving the relevance of results generated by the search system.

25 Claims, 4 Drawing Sheets

SYSTEM AND METHOD FOR MEASURING AND IMPROVING SEARCH RESULT RELEVANCE BASED ON USER SATISFACTION

BACKGROUND OF THE INVENTION

1. Field of the Invention

The present invention relates to the field of information retrieval and, more specifically, to measuring and improving search result relevance.

2. Description of the Prior Art

The relevance of a search result is the extent to which the result correlates to the intent of the user performing the search. Users often have a choice of systems on which to conduct a search, and such users are generally most likely to choose a system that provides them with the most relevant results. Thus, to attract and satisfy users, it is necessary to measure the relevance of results provided by a search system. Because result sets may often include a wide array of complex data, such relevance measurements often involve a detailed process of operations and calculations.

In conventional methods for measuring relevance, results are generally evaluated based on two factors: precision and recall. Precision is a measure of the purity of a result set or, more specifically, of how well a search avoids returning results that are not relevant. For example, if a search requests documents about "John Deere tractors", and the search term "John Deere" is included in a submitted query, then the precision of the results would be lowered if the result set included documents that weren't about tractors but, rather, included references to a person whose name was "John Deer".

Recall is a measure of the completeness of a result set. For example, if a search requests documents about "John Deere tractors", then the recall of the results is raised if the result set includes documents about John Deere tractors, Ford tractors, etc. Thus, there is a trade-off between precision and recall. Generally, the higher the precision, the lower the recall, and, the higher the recall, the lower the precision.

A drawback of measuring relevance based on recall and precision is that they do not effectively measure user satisfaction, which is the extent to which the user perceives a result to correlate with his intent. There are several conditions which are likely to cause the user to be dissatisfied with highly precise and highly complete results. Such conditions may include, for example, poor content quantity, poor content quality, poor intent determination, poor result ranking, and poor result description.

In the case of poor content quality, the quality of the content that is being searched is insufficient to satisfy the user's intent. Even a highly precise and highly complete search of low quality content is unlikely to produce satisfactory results.

In the case of poor content quantity, the quantity of the content that is being searched is insufficient to satisfy the user's intent. Even a highly precise and highly complete search of low quantity content is unlikely to produce satisfactory results.

In the case of poor intent determination, the search system is unable to sufficiently determine the user's intent. Thus, if irrelevant content is being searched for, then even a highly precise and highly complete search is unlikely to produce satisfactory results.

In the case of poor result ranking, less relevant results are presented to a user before more relevant results. Such poor result ranking affects user satisfaction because users often consider a first few results rather than an entire set of results before determining their level of satisfaction with a search.

Thus, poor result ranking may cause the user to quit a search or switch to another search system before encountering highly relevant results. Thus, if results are poorly ranked, then even a highly precise and highly complete search is unlikely to produce satisfactory results.

In the case of poor result description, the search system is unable to sufficiently describe results to the user. Users often base their decision of whether to request a result based on such a description. Thus, even if a result is highly relevant, the user may not request it if it is poorly described. Thus, if results are poorly described, then even a highly precise and highly complete search is unlikely to produce satisfactory results.

Because users ultimately determine on which system they will perform a search, user satisfaction is a highly important measure of relevance. Thus there is a need in the art for systems and methods for measuring and improving search result relevance based on user satisfaction.

SUMMARY OF THE INVENTION

Accordingly, systems and methods for managing and improving search result relevance based on user satisfaction are disclosed. During a search, user actions such as, for example, submitting a query and interacting with query results are preferably logged in an event log. Each record of such a user action is preferably associated with a specific user via, for example, a user identifier or a client identifier. Time intervals such as, for example, a flex time and a timeout, are preferably measured from the commission of each action. An expiration of such a time interval prior to a commission of a subsequent action is preferably also logged.

The event log may be scanned to determine the start and the end of a session, which is a set of actions committed by the user in which the user's intent is continuous. The session preferably starts with a submission of an initial query and preferably includes a set of interactions with results. In addition to the initial query, a session may include multiple "re-queries", which are reformulations of the initial query. The session preferably ends when the user either finds content that correlates with his intent or decides to abandon his search.

User behaviors within the session may be identified. Behaviors are the user's response to being presented with a result. Exemplary behaviors may include invoking, ignoring, skipping, rejecting, exploring, or accepting the result. Identified behaviors within the session preferably occur within a valid sequence of behaviors.

User satisfaction may be estimated based on the user behaviors. User satisfaction is a measure of the user's perception of the extent to which a result correlates to his intent based on his behaviors. User satisfaction is preferably estimated to be one of three satisfaction levels: satisfied, partially-satisfied, and dissatisfied.

Symptoms, which are indications of a need for improvement within the search system, may be observed based on the user behaviors and the user satisfaction. Such symptoms are preferably used to derive diagnostics, which are conditions that prevent the system from performing optimally.

A performance report based, at least in part, on the user satisfaction and the diagnostics may be generated. Such a report may be analyzed to determine methods for improving the relevance of results generated by the search system. The report may be stored for further processing.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which.

DETAILED DESCRIPTION

Figure 1:
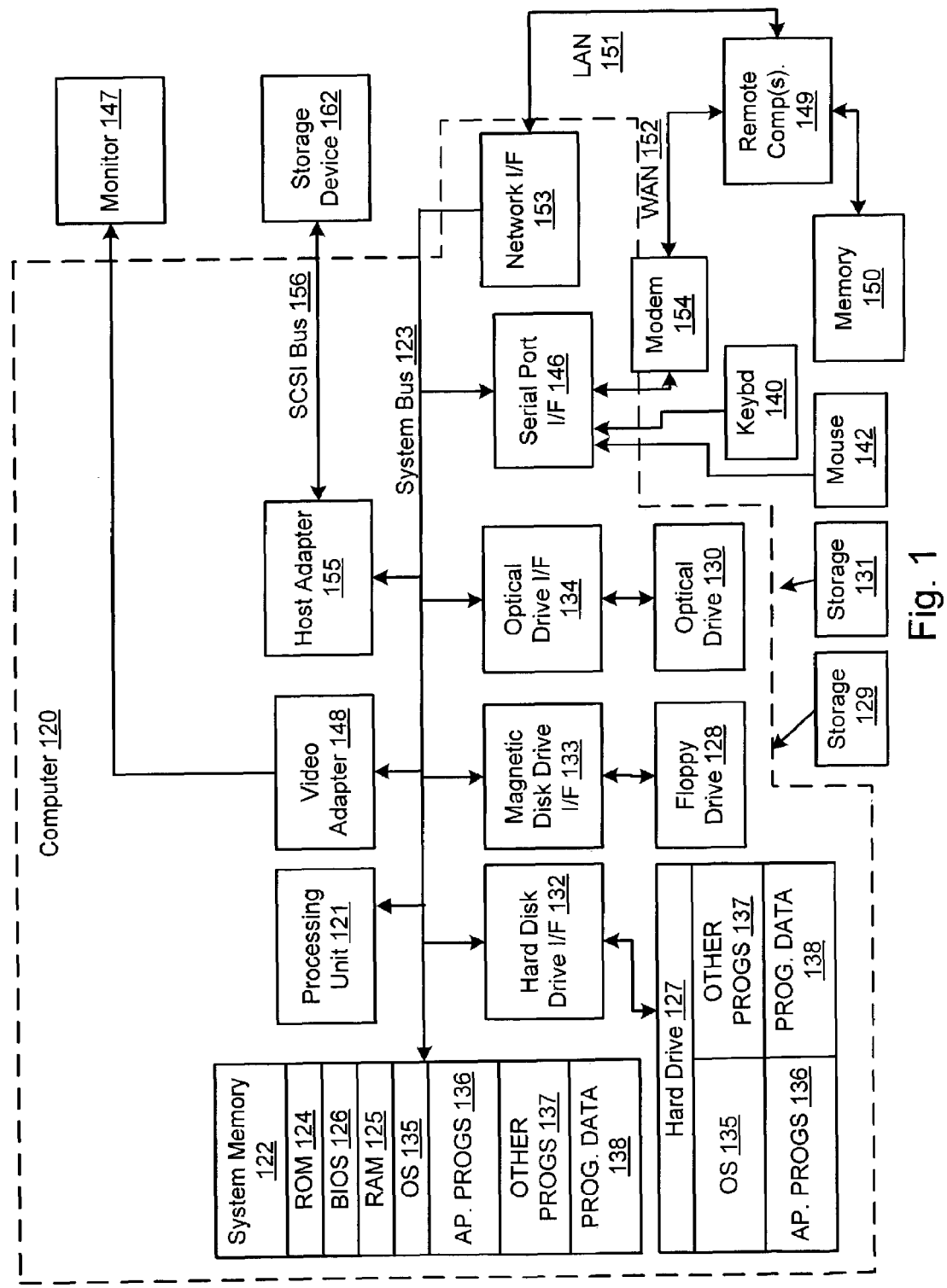
FIG. 1 is a block diagram representing a general purpose computer system in which aspects of the present invention and/or portions thereof may be incorporated.

Systems and methods that meet the above-mentioned objects and provide other beneficial features in accordance with the presently preferred exemplary embodiments of the invention will be described below with reference to aforementioned Figures. Those skilled in the art will readily appreciate that the description given herein with respect to those figures is for explanatory purposes only and is not intended in any way to limit the scope of the invention. Throughout the description, like reference numerals will refer to like elements in the respective figures.

Computer Environment

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application 212 programs 136, other program modules 137 and program data 138. A user may enter commands and information into the personal computer 120 through input devices such as a keyboard 140 and pointing device 142 such as a mouse. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Exemplary Systems and Methods of the Present Invention

Figure 2:
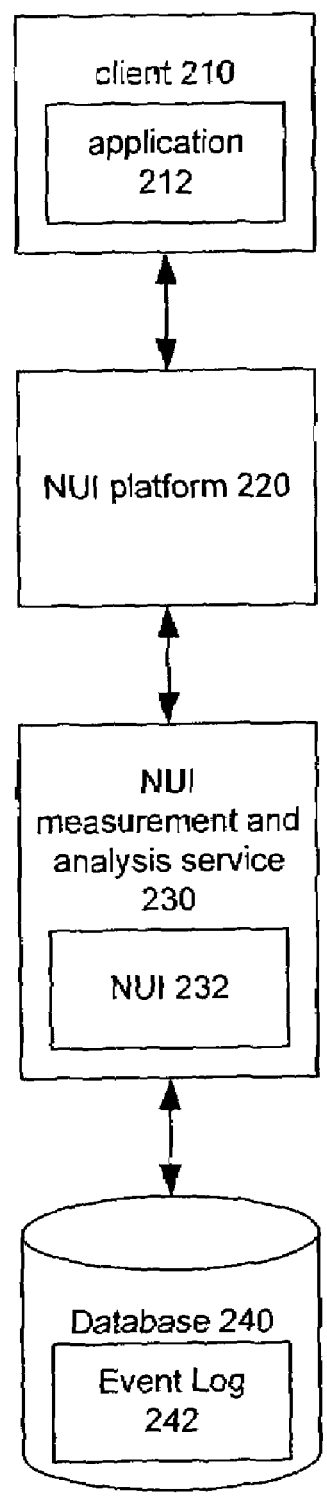
FIG. 2 is a block diagram of an exemplary search system in accordance with the present invention.

A block diagram of an exemplary search system in accordance with the present invention is shown in FIG. 2. As shown, the system includes client 210, network user interface (NUI) platform 220, NUI measurement and analysis service 230, and database 240.

Client 210 is preferably a computing device such as computer 120 shown in FIG. 1. As should be appreciated, although only a single client 210 is shown, multiple clients may be included in the exemplary system. An application 212 that enables a user to conduct a search such as, for example, a web browser, preferably runs at client 210.

Application 212 preferably receives queries provided by a user. Queries are preferably provided using an input device such as, for example, keyboard 140 or an attached microphone for voice response systems. Such queries are preferably presented by the user via a "query interface" such as, for example, a search prompt on a web page.

Application 212 also preferably presents results to the user. A brief description of each search result is preferably also presented to the user. Such results and descriptions are preferably presented via a presentation device such as, for example, monitor 147 or an attached speaker for voice response systems. Presented results are preferably ranked in an estimated order of relevance in relation to the query.

Application 212 preferably presents results and descriptions via a "result description interface" such as, for example, a web page listing such results and descriptions. The result description interface may include the query interface. For example, on a web page, a search prompt may appear at the end of a list of results. Alternatively, for example, the user may return to the query interface from the result description interface by clicking a "back" button on a browser.

Application 212 also preferably enables the user to interact with results. The user preferably interacts with results via the input devices. For example, the user may request a result by clicking on a uniform resource locator (URL) corresponding to the result using mouse 142 or saying "yes" in response to the result using the attached microphone for voice response systems. Each result is preferably displayed in a "result interface." The result interface may, for example, open in a separate window when the corresponding result is clicked in the result description interface. Alternatively, for example, the result interface may open in the same window as the result description interface, and the user may return to the result description interface from the result interface by clicking a "back" button on a browser. The result interface may be presented automatically in response to a query if it is the only result.

The user may optionally take actions within the result interface. For example, while on a web page corresponding to a result, the user may click on a URL to another web page that the user considers to be more relevant to his intent.

The result interface may provide a "business objective" such as, for example, a prompt to buy a product or sign up for a service. The user may, in turn, participate in the business objective by, for example, buying the product or signing up for the service.

Application 212 may associate actions with a corresponding user or device. For example, when application 212 is launched, a user identifier or password assigned to a corresponding user may be requested. Furthermore, client 210 may be assigned a corresponding device identifier. When the user performs an action at client 210, such as, for example, submitting a query, requesting a result, returning to the query interface, returning to the result description interface, closing the result interface, taking action in the result interface, and participating in a business objective, application 212 preferably submits the action for processing along with the corresponding user identifier or device identifier.

NUI platform 220 is preferably a computing device such as computer 120 shown in FIG. 1. NUI platform 220 preferably supplies results to application 212 in response to queries and manages the transfer of information between devices such as client 210 and NUI measurement and analysis service 230. Client 210 may communicate with NUI platform 220 via a local area network (LAN). NUI platform 220 may communicate with NUI measurement and analysis service 230 via a LAN or a wide area network (WAN) such as the internet.

When client 210 submits an action for processing, NUI platform 220 preferably receives the action, and passes the action to NUI platform measurement and analysis service 230.

NUI measurement and analysis service 230 is preferably a computing device such as computer 120 shown in FIG. 1. NUI 232 is preferably an application running at NUI measurement and analysis 230. NUI 232 preferably receives actions, submits actions for processing, and receives and submits results.

Additionally, NUI 232 preferably logs user actions in event log 242 at database 240. Each action is preferably logged along with its corresponding user or device identifier. Furthermore, NUI 232 preferably logs actions along with a corresponding timestamp. The timestamp is preferably a value maintained by NUI 232.

Related to the timestamp, NUI 232 preferably maintains time intervals related to the search. For example, NUI 232 preferably maintains a "flex time", in which the user is expected to realize whether a result is at least partially related to his search intent. NUI 232 also preferably maintains a "timeout", in which the user is expected to realize whether a result is substantially related to his search intent. The timeout is preferably longer than the flex time. The time parameters may be default values or may be variable values determined and set by an administrator, for example.

Figure 3:
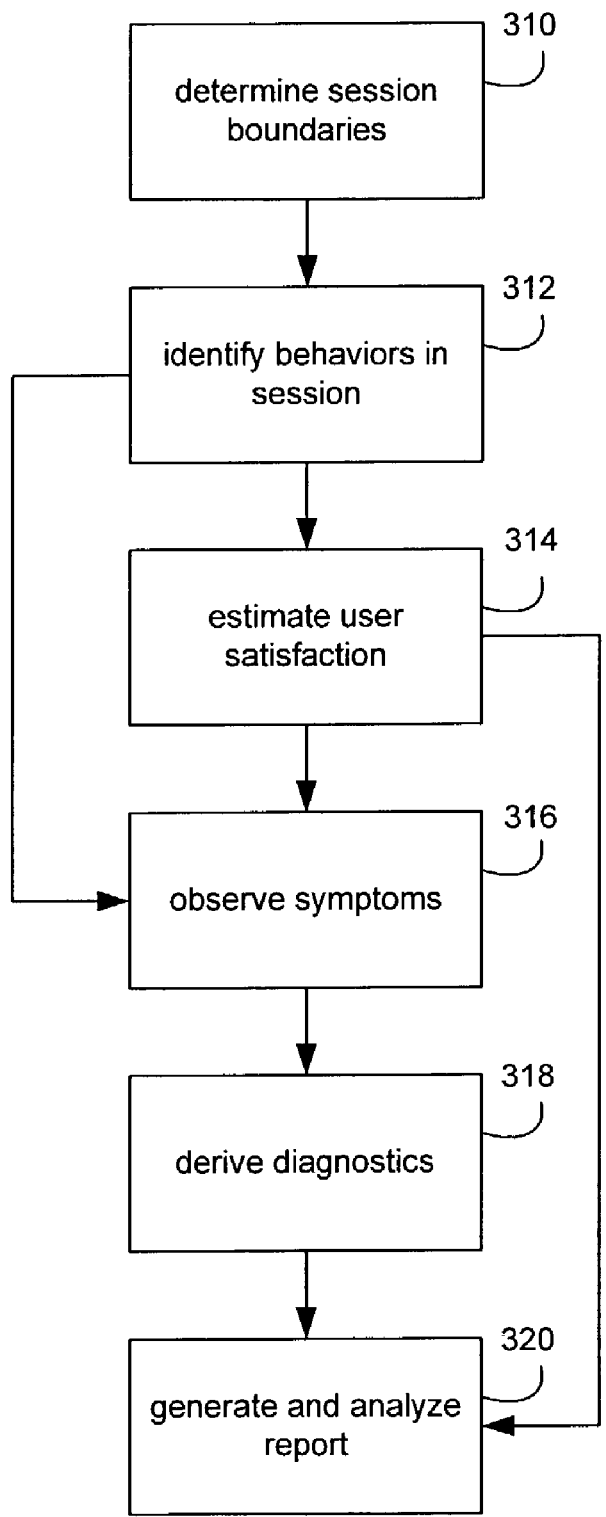
FIG. 3 is a flowchart of an exemplary method for measuring and improving relevance based on user satisfaction in accordance with the present invention.

The records stored in event log 242 are preferably scanned to measure and improve relevance. A flowchart of an exemplary method for measuring and improving relevance based on user satisfaction in accordance with the present invention is shown in FIG. 3. The exemplary method shown in FIG. 3 is preferably performed by a computing device such as computer 120 shown in FIG. 1. Such a computing device preferably has access to log 242.

As shown, at step 310, session boundaries are determined. A session is a set of actions committed by the user in which the user's intent is continuous. The session preferably starts with a submission of an initial query and preferably includes a set of interactions with results. In addition to the initial query, a session may include multiple "re-queries", which are reformulations of the initial query. For example, if a user's intent is to find information about "John Deere tractors", then the user may conduct a search session including queries "tractors", "John Deere", and "John Deere tractors". The session preferably ends when the user either finds content that correlates with his intent or decides to abandon his search.

The start of the session is preferably determined by scanning event log 242 to identify an initial query. Such an initial query may be identified based on factors such as, for example, the user identifier and the client identifier. For example, if a query action in event log 242 has a corresponding user identifier, then the user identifier is preferably compared with the user identifiers associated with actions in currently "open" sessions. If, for example, the user identifier of the query action does not match a user identifier in any currently open session, then the query action may be identified as an initial query in a new session. Alternatively, for example, if the user identifier of the query action matches a user identifier in any currently open session, then the query action may be identified as a re-query in the matching session. Other methods for identifying a start of a session are contemplated The end of an open session is preferably determined by, for example, identifying a timeout after a last event in the session. For example, if a last event in an open session has a corresponding timestamp of "10" and the timeout parameter of NUI 232 is set to "5", then the session is preferably determined to end if no other session actions are identified before the timestamp reaches "15". Other methods for identifying an end of a session are contemplated.

At step 312, behaviors within the session are identified. A Behavior is a user's response to being presented with a result. Exemplary behaviors may include invoking, ignoring, skipping, rejecting, exploring, or accepting the result.

Invoking a result means that the result was presented to the user and the user requested the result. For example, a user may invoke a result by clicking on the result or saying "yes" in response to the result. Some applications may invoke a result automatically if it is the only result generated by a search.

Ignoring a result means that the result was presented to the user and the user decided not to request the result. For example, a user may ignore a result by saying "no" in response to the result. A result may be presumed to be ignored if the user does not invoke a first result and does invoke a second subsequent result. For example, if results are displayed to the user in a list, then the top result in the list may be presumed ignored if it is not invoked and if the second result in the list is invoked.

Skipping a result means that the user invoked the result and used the result as an intermediary to performing another action. A skip may be indicated by, for example, taking action in the result interface.

Rejecting a result means that the user invoked the result and quickly decided that it was not related to his intent. A rejection may be indicated by, for example, an invocation of a result and an exit from the result unit, a return to the query unit, or a return to the result description unit prior to expiration of the flex time.

Exploring a result means that the user invoked the result and decided that it was partially related to his intent. An exploration is indicated by, for example, an invocation of a result and an exit from the result unit, a return to the query unit, or a return to the result description unit after expiration of the flex time and prior to expiration of the timeout.

Accepting a result means that the user invoked the result and decided that it was substantially related to his intent. An acceptance may be indicated by, for example, a business action such as, for example, purchasing a product or enrolling in a service. An acceptance may also be indicated by, for example, an invocation of the result and an expiration of the timeout prior to a subsequent user action.

User behaviors within a session should desirably correspond to a valid sequence of behaviors. For example, a user desirably should not accept a result prior to invoking it. An exemplary method for determining whether a behavior is valid is discussed below with reference to FIG. 4. Preferably, if a behavior within a session does not occur within a valid sequence of behaviors, then the behavior is ignored.

An exemplary valid sequence of behaviors within a session is shown below in Table 1:

TABLE 1

| Result | Corresponding Behaviors |
|---|---|
| 1-$q_0$ | Ignore |
| 2-$q_0$ | Invoke, Skip, Reject |
| 3-$q_0$ | Invoke, Accept |

As shown in Table 1, the first result for the initial query, "$q_0$", was ignored. The second result was invoked, skipped, and rejected. The third result was invoked and accepted, thereby ending the session.

At step 314, user satisfaction is estimated. User satisfaction is a measure of the user's perception of the extent to which a result correlates to his intent. User satisfaction is preferably estimated on a per-result basis and is preferably estimated to be one of three satisfaction levels: satisfied, partially-satisfied, and dissatisfied. Satisfaction indicates that the user perceived the corresponding result to completely correlate with his intent. Partial-satisfaction indicates that the user perceived the corresponding result to partially correlate with his intent. Dissatisfaction indicates that the user perceived the corresponding result to not correlate with his intent.

User satisfaction is preferably estimated based on the user's behaviors with respect to the corresponding result. For example, satisfaction may be indicated by accepting the corresponding result, partial-satisfaction may be indicated by exploring the corresponding result, and dissatisfaction may be indicated by rejecting or ignoring the corresponding result. Exemplary relationships between user behavior and user satisfaction for an exemplary session are shown below in Table 2:

TABLE 2

| Result | Corresponding Behaviors | Estimated Satisfaction Level |
|---|---|---|
| 1-$q_0$ | Ignore | Dissatisfied |
| 2-$q_0$ | Invoke, Skip, Reject | Dissatisfied |
| 3-$q_0$ | Invoke, Accept | Satisfied |

As shown in Table 2, the first result for the initial query was ignored, which preferably indicates dissatisfaction. The second result was invoked, skipped, and rejected, which preferably indicates dissatisfaction. The third result was invoked and accepted, which preferably indicates satisfaction.

In an alternative embodiment, user satisfaction may be determined directly by asking the user, preferably via a prompt displayed by application 212, if he is satisfied with a corresponding result.

At step 316, symptoms are observed. Symptoms are indications of a need for improvement within the search system. Such symptoms are preferably determined based on the behaviors identified at step 312 and the satisfaction measures estimated at step 314. Exemplary symptoms may include lower satisfaction, lower invocation, skip present, re-query present, re-query successful, no accept, lower partial-satisfaction, no result, and high explore behavior.

Lower satisfaction is a symptom that is preferably indicated by, for example, a first result in a list of results being less satisfactory than a second result in the list.

Lower invocation is a symptom that is preferably indicated by, for example, a first result in a list of results being invoked less frequently than a second result in the list.

Skip present is a symptom that is preferably indicated by a skip behavior.

Re-query present is a symptom that is preferably indicated by a re-query.

Re-query successful is a symptom that is preferably indicated by, for example, a satisfactory re-query result.

No accept is a symptom that is preferably indicated by, for example, a query with no accepted results.

Lower partial-satisfaction is a symptom that is preferably indicated by, for example, a set of results including more results with which the user is dissatisfied than with which he is satisfied.

No result is a symptom that is preferably indicated by, for example, a query that generates no results.

High explore behavior is a symptom that is preferably indicated by, for example, a set of results within which no results are rejected and more results are explored than are accepted.

Exemplary relationships between user behavior, user satisfaction, and symptoms for an exemplary session are shown below in Table 3:

TABLE 3

| Result | Behaviors | Satisfaction | Symptoms |
|---|---|---|---|
| 1-$q_0$ | Ignore | Dissatisfied | Lower Satisfaction Lower Invocation |
| 2-$q_0$ | Invoke, Skip, Reject | Dissatisfied | Lower Satisfaction Skip Present |
| 3-$q_0$ | Invoke, Accept | Satisfied | None |

As shown in Table 3, the first result was ignored while the second and third results were invoked, thereby indicating the symptom lower satisfaction. Furthermore, the user was dissatisfied with the first and second results while he was satisfied with the third result, thereby indicating the symptom lower satisfaction. Additionally, the second result was skipped, thereby indicating the symptom skip present.

At step 318, diagnostics are derived. Diagnostics are conditions that prevent the search system from performing optimally. Diagnostics are preferably derived based on the symptoms observed at step 316. Exemplary diagnostics may include content quantity, poor content quality, intent determination, result ranking, result precision, and result description.

Content quantity preferably suggests that the quantity of search content should desirably be increased to make the system more satisfactory to users. Content quantity is preferably indicated by, for example, the combination of symptoms re-query present, no result, no accept, and re-query successful.

Content quality preferably suggests that the quality of search content should desirably be improved to make the system more satisfactory to users. Content quality is preferably indicated by, for example, the symptom lower partial-satisfaction.

Intent determination preferably suggests that the system's ability to understand users' intent should desirably be improved to make the system more satisfactory to users. Intent determination is preferably indicated by, for example, the combination of symptoms re-query present, re-query successful, no accept, and no result.

Result ranking preferably suggests that the ranking of search results based on relevance in relation to a query should desirably be improved to make the system more satisfactory to users. Result ranking is preferably indicated by, for example, the symptom lower satisfaction.

Result precision preferably suggests that the identification of precise results in relation to a query should desirably be improved to make the system more satisfactory to users. Result precision is preferably indicated by, for example, the symptoms skip present and high explore behavior.

Result description preferably suggests that the description of results should desirably be improved to make the system more satisfactory to users. Result description is preferably indicated by, for example, the presence of symptom lower invocation and absence of the symptom lower satisfaction.

Exemplary relationships between symptoms and diagnostics for an exemplary session are shown below in Table 4:

TABLE 4

| Result | Behaviors | Satisfaction | Symptoms | Diagnostics |
|---|---|---|---|---|
| 1-$q_0$ | Ignore | Dissatisfied | Lower Satisfaction Lower Invocation | Result Ranking Result Description |
| 2-$q_0$ | Invoke, Skip, Reject | Dissatisfied | Lower Satisfaction Skip Present | Result Ranking Result Description Result Precision |
| 3-$q_0$ | Invoke, Accept | Satisfied | None | None |

As shown in Table 4, both the first and second results indicated the symptom lower satisfaction, which, in turn, indicates the diagnostics result ranking and result description. Furthermore, the first result indicates the symptom lower invocation, which, in turn, also indicates the symptom result description. Additionally, the second result indicates the symptom skip present, which, in turn, indicates the diagnostic result precision.

At step 320, a report may be generated based, at least in part, on the user satisfaction estimated at step 314 and diagnostics determined at step 318. Step 320 is an optional step. Such a report may be analyzed to determine methods for improving the relevance of results generated by the search system. The report may be stored for further processing.

Figure 4:
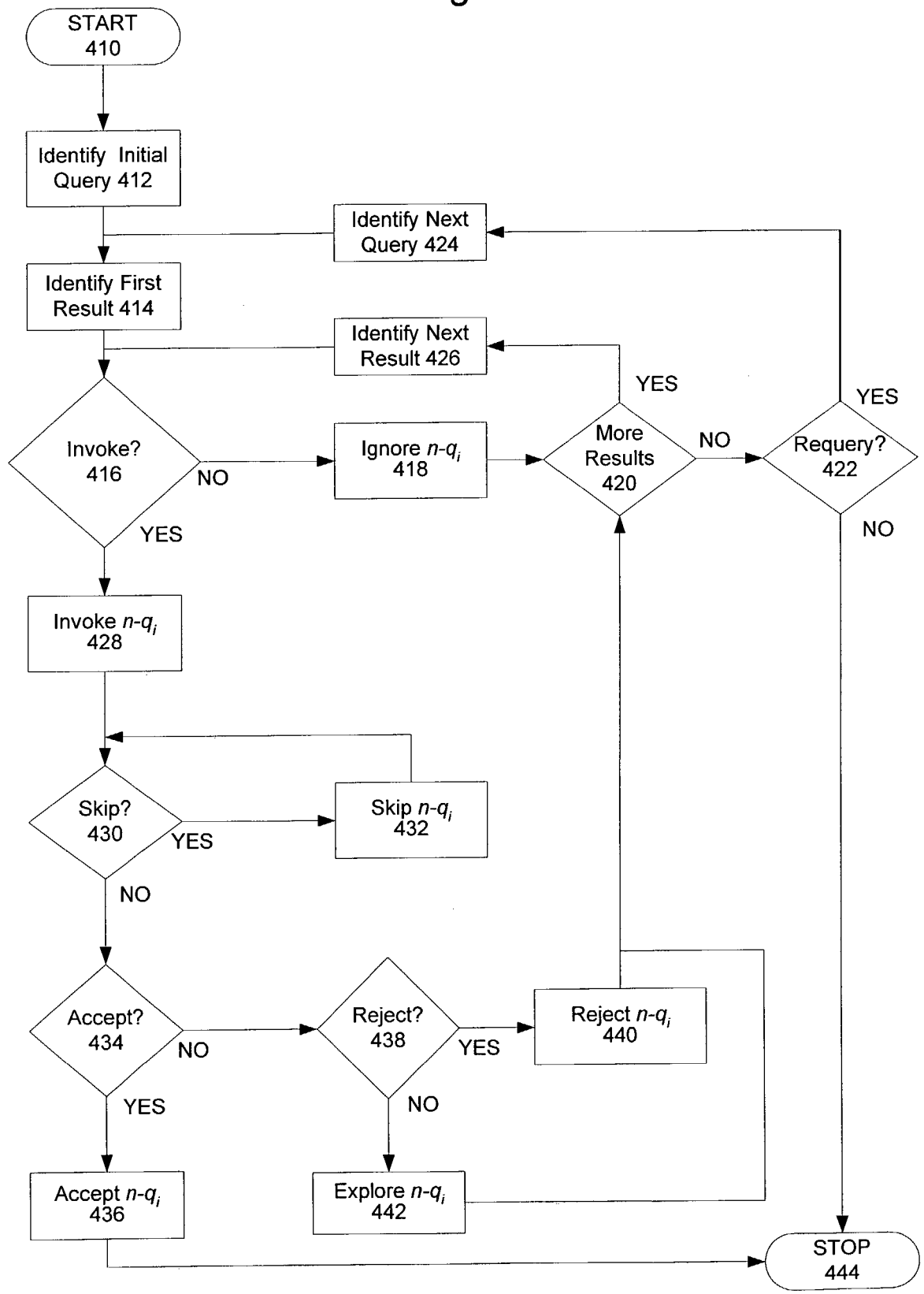
FIG. 4 is a flowchart of an exemplary method for exemplary method for determining whether a behavior is valid in accordance with the present invention.

A flowchart of an exemplary method for determining if a behavior is valid in accordance with the present invention is shown in FIG. 4. As shown, at step 410, the method starts. At step 412, an initial query is identified, and, at step 414, a first result is identified.

At step 416, it is determined whether the user invoked the result. Alternatively, if, for example, only a single result is presented, then step 416 may be skipped and, at step 428, it may be assumed that the user validly invoked the result.

If the user did not invoke the result, then, at step 418, a valid ignore behavior is identified. At step 420, it is determined whether more results are present.

If no more results are present, then, at step 422, it is determined whether a re-query is submitted. If there is a re-query, then, at step 424, the re-query is identified and, at step 414, the first result for the re-query is identified.

If there is no re-query, then, at step 444, the session is determined to have ended.

If, at step 420, it is determined that more results are present, then, at step 426, the next result is identified, and the method returns to step 416, at which it is determined whether the user invoked the next result.

If, at step 416, it is determined that the user invoked the result, then, at step 428, a valid invoke behavior is identified. At step 430, it is determined whether the user skipped the result.

If the user skipped the result, then, at step 432, a valid skip behavior is identified, and the method returns to step 430.

If the user did not skip the result, then, at step 434, it is determined whether the user accepted the result.

If the user accepted the result, then, at step 436, a valid accept behavior is identified, and, at step 444, the session is determined to have ended.

If the user did not accept the result, then, at step 438, it is determined whether the user rejected the result.

If the user rejected the result, then, at step 440, a valid reject behavior is identified, and the method returns to step 420, at which it is determined whether more results are present.

If the user did not reject the result, then at step 442, a valid explore behavior is identified, and, at step 444, the session is determined to have ended.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

We claim:

1. A method for measuring the relevance of results in a search session, the search session including a set of actions, the method comprising:
   executing instructions stored in memory, the instructions comprising:
      logging a plurality of user actions in an event log;
      determining a start of the search session by scanning the event log to identify an initial query;
      determining an end of the search session by identifying an expiration of a timeout before an action is committed by a user;
      for each result in the search session, identifying at least one user behavior in response to the result, the user behavior identified by determining whether the user has performed each of ignoring the result, rejecting the result, exploring the result, and accepting the result;
      estimating a level of satisfaction with respect to the results in the search session based on the user behavior, whereby the level of satisfaction is estimated using three satisfaction tiers comprising dissatisfaction, satisfaction, and partial satisfaction, and whereby ignoring the result is estimated as dissatisfaction with the result, rejecting the result is estimated as dissatisfaction with the result, accepting the result is estimated as satisfaction with the result, and exploring the result is estimated as partial satisfaction with the result;
      using the estimated level of satisfaction with respect to the results in the search session to determine an electronic search system's ability to provide relevant search results that correlate to intents of user queries;
      observing symptoms based on the at least one user behavior and the estimated level of satisfaction, the symptoms indicating a need for improvements within the electronic search system;
      deriving diagnostics based on the observed symptoms, the diagnostics being conditions that prevent the electronic search system from performing optimally, wherein the diagnostics comprise at least one member of a group comprising content quantity, poor content quality, intent determination, result ranking, result precision, and result description, wherein deriving diagnostics comprises:
         deriving the diagnostic content quantity when symptoms re-query present, no result, no accept, and re-query successful are observed; and
         deriving the diagnostic poor content quality when symptom lower partial-satisfaction is observed; and
      generating a performance report for the electronic search system based on the diagnostics and the estimated level of satisfaction.

2. The method of claim 1, wherein determining the end of the search session comprises scanning the event log to determine the end of the search session.

3. The method of claim 1, wherein determining the start and the end of the session comprises determining the start and the end of the session based on at least one member of a group comprising a user identifier and a client identifier.

4. The method of claim 1, wherein the user behavior is identified by further determining whether the user has performed each of invoking the result and skipping the result.

5. The method of claim 1, wherein observing symptoms comprises observing at least one member of a group comprising lower satisfaction, lower invocation, skip present, re-query present, re-query successful, no accept, lower partial-satisfaction, no result, and high explore behavior.

6. The method of claim 5, wherein deriving diagnostics further comprises:
   deriving the diagnostic intent determination when the symptoms re-query present, re-query successful, no accept, and no result are observed;
   deriving the diagnostic result ranking when the symptom lower satisfaction is observed;
   deriving the diagnostic result precision when the symptoms skip present and high explore behavior are observed; and
   deriving the diagnostic result description when the symptom lower invocation is observed and the symptom lower satisfaction is not observed.

7. The method of claim 1, wherein the instructions further comprise analyzing the report to improve the relevance of results generated by the search system.

8. A method for measuring the relevance of a search result, the method comprising:
   executing instructions stored in memory, the instructions comprising:
      identifying at least one user behavior in response to the search result, the user behavior identified by determining whether the user has performed each of ignoring the search result, rejecting the search result, exploring the search result, and accepting the search result; and
      estimating a level of satisfaction with respect to the search result based on the at least one user behavior, whereby the level of satisfaction is estimated using three satisfaction tiers comprising dissatisfaction, satisfaction, and partial satisfaction, and whereby ignoring the search result is estimated as dissatisfaction with the search result, rejecting the search result is estimated as dissatisfaction with the search result, accepting the search result is estimated as satisfaction with the search result, and exploring the search result is estimated as partial satisfaction with the search result; and
      using the estimated level of satisfaction with respect to the search result to improve the relevance of results generated by the search system by identifying at least one diagnostic selected from a group comprising content quantity, poor content quality, intent determination, result ranking, result precision, and result description, wherein identifying at least one diagnostic comprises:

identifying the diagnostic content quantity when re-query present, no result, no accept, and re-query successful are observed; and identifying the diagnostic poor content quality when lower partial-satisfaction is observed.

9. The method of claim 8, wherein the user behavior is identified by further determining whether the user has performed each of invoking the search result and skipping the search result.

10. The method of claim 8, wherein the instructions further comprise observing at least one member of a group comprising lower satisfaction, lower invocation, skip present, re-query present, re-query successful, no accept, lower partial-satisfaction, no result, and high explore behavior.

11. The method of claim 10, wherein identifying the at least one diagnostic further comprises:

identifying the diagnostic intent determination when re-query present, re-query successful, no accept, and no result are observed;

identifying the diagnostic result ranking when lower satisfaction is observed;

identifying the diagnostic result precision when skip present and high explore behavior are observed; and identifying the diagnostic result description when lower invocation is observed and lower satisfaction is not observed.

12. The method of claim 8, wherein the instructions further comprise generating a performance report for the search system based on the problem and the level of satisfaction.

13. The method of claim 12, wherein the instructions further comprise analyzing the report to improve the relevance of search results generated by the search system.

14. A system for measuring the relevance of an electronic search result, the system comprising:

a database for storing a log of actions performed by a user during a search;

a computing device in communication with said database, the computing device comprising:

a processor operative to execute computer executable instructions; and a memory having stored therein computer executable instructions for performing the following steps:

scanning the log to identify a user behavior in response to the electronic search result, the user behavior identified by determining whether the user has performed each of ignoring the electronic search result, rejecting the electronic search result, exploring the electronic search result, and accepting the electronic search result;

estimating a level of satisfaction with respect to the electronic search result based on the user behavior, whereby the level of satisfaction is estimated using three satisfaction tiers comprising dissatisfaction, satisfaction, and partial satisfaction, and whereby ignoring the electronic search result is estimated as dissatisfaction with the electronic search result, rejecting the electronic search result is estimated as dissatisfaction with the electronic search result, accepting the electronic search result is estimated as satisfaction with the electronic search result, and exploring the electronic search result is estimated as partial satisfaction with the electronic search result; and using the estimated level of satisfaction with respect to the electronic search result to determine an electronic search system's ability to provide relevant search results that correlate to intents of user queries by identifying at least one diagnostic selected from a group comprising content quantity, poor content quality, intent determination, result ranking, result precision, and result description, wherein identifying at least one diagnostic comprises:

identifying the diagnostic content quantity when symptoms re-query present, no result, no accept, and re-query successful are observed;

identifying the diagnostic poor content quality when symptom lower partial-satisfaction is observed.

15. The system of claim 14, wherein the user behavior is identified by further determining whether the user has performed each of invoking the electronic search result and skipping the electronic search result.

16. The system of claim 14, wherein the memory has stored therein further computer executable instructions for observing symptoms based on the behavior and the level of satisfaction, the symptoms indicating needs for improvements within the electronic search system.

17. The system of claim 16, wherein observing symptoms comprises observing at least one member of a group comprising lower satisfaction, lower invocation, skip present, re-query present, re-query successful, no accept, lower partial-satisfaction, no result, and high explore behavior.

18. The system of claim 17, wherein identifying diagnostics further comprises:

identifying the diagnostic intent determination when the symptoms re-query present, re-query successful, no accept, and no result are observed;

identifying the diagnostic result ranking when the symptom lower satisfaction is observed;

identifying the diagnostic result precision when the symptoms skip present and high explore behavior are observed; and identifying the diagnostic result description when the symptom lower invocation is observed and the symptom lower satisfaction is not observed.

19. The system of claim 14, wherein the memory has stored therein further computer executable instructions for generating a performance report for the electronic search system based on the at least one diagnostic and the estimated level of satisfaction.

20. The system of claim 19, wherein the database is further configured for storing the performance report for further processing.

21. A method for improving performance of a search system, the method comprising:

executing instructions stored in memory, the instructions comprising:

observing symptoms based on user behaviors with respect to one or more search results and user satisfaction with respect to the one or more search results, the symptoms enabling the search system's performance to be evaluated by indicating needs for improvements within the search system; and deriving diagnostics based on the symptoms, the diagnostics being conditions that prevent the search system from performing optimally, wherein the diagnostics comprise at least one member of a group comprising content quantity, poor content quality, intent determination, result ranking, result precision, and result description, wherein deriving diagnostics comprises:

deriving the diagnostic content quantity when symptoms re-query present, no result, no accept, and re-query successful are observed;

deriving the diagnostic poor content quality when symptom lower partial-satisfaction is observed; and using the diagnostics to improve the search system's ability to provide more relevant results that correlate to intents of user queries.

22. The method of claim 21, wherein the user satisfaction with respect to the one or more search results is estimated based on the user behaviors.

23. The method of claim 21, wherein observing symptoms comprises observing at least one member of a group comprising lower satisfaction, lower invocation, skip present, re-query present, re-query successful, no accept, lower partial-satisfaction, no result, and high explore behavior.

24. The method of claim 23, wherein deriving diagnostics further comprises:

deriving the diagnostic intent determination when the symptoms re-query present, re-query successful, no accept, and no result are observed;

deriving the diagnostic result ranking when the symptom lower satisfaction is observed;

deriving the diagnostic result precision when the symptoms skip present and high explore behavior are observed; and deriving the diagnostic result description when the symptom lower invocation is observed and the symptom lower satisfaction is not observed.

25. The method of claim 21, wherein the instructions further comprise generating a performance report for the search system based on the diagnostics and the user satisfaction with respect to the one or more search results.

* * * * *